(12) United States Patent
You et al.

(10) Patent No.: US 7,613,145 B2
(45) Date of Patent: Nov. 3, 2009

(54) METHOD FOR FAST RESOURCE SCHEDULING IN BASE STATION AND THE BASE STATION

(75) Inventors: Mingli You, Shanghai (CN); Tao Yang, Shanghai (CN); Hongbao Zhang, Shanghai (CN); Zhigang Luo, Shanghai (CN); Ning Lu, Shanghai (CN); Pingping Wen, Shanghai (CN)

(73) Assignee: Alcatel Lucent, Paris (FR)

( * ) Notice: Subject to any disclaimer, the term of this patent is extended or adjusted under 35 U.S.C. 154(b) by 601 days.

(21) Appl. No.: 11/295,613

(22) Filed: Dec. 7, 2005

(65) Prior Publication Data

US 2006/0133313 A1 Jun. 22, 2006

(30) Foreign Application Priority Data

Dec. 22, 2004 (CN) .................. 2004 1 0093409

(51) Int. Cl.
*H04W 4/00* (2006.01)
(52) U.S. Cl. .................. 370/328; 370/230; 370/465; 455/452.2; 455/456.2
(58) Field of Classification Search ............ 370/329, 370/252, 311, 335, 474, 310, 235, 342, 328, 370/394, 348, 465, 522, 230; 450/424, 425, 450/456.5, 456.6, 550.1, 575.1, 450, 451, 450/434, 436, 432.2, 62, 525, 522, 453, 561, 450/455, 515; 375/135, 136, 146, 147, 220, 375/221
See application file for complete search history.

(56) References Cited

U.S. PATENT DOCUMENTS 6,882,857 B2 * 4/2005 Zhang et al. ............ 455/522

(Continued)

FOREIGN PATENT DOCUMENTS

EP 1 343 302 A1 9/2003

(Continued)

OTHER PUBLICATIONS

3GPP: "3$^{rd}$ Generation Partnership Project; Technical Specification Group radio Access Network; Feasibility study for Enhanced Uplink for UTRA FDD (Release 6) 3GPP TR 25.896 V2.0.0" 3$^{rd}$ Generation Partnership Project (3GPP; Technical report No. 25896, Mar. 2004 pp. 1-180; XP002330848.

*Primary Examiner*—Duc Nguyen
*Assistant Examiner*—Charles Chow
(74) *Attorney, Agent, or Firm*—Fay Sharpe LLP

(57) ABSTRACT

The present invention discloses methods and apparatuses for fast resource scheduling at the base station and fast transport format combination selection at the UE by using different pointers in base station and user equipment of wireless network. The TFCS in base station and UE are divided into TFCsbs each of which is a set of TFCs with the same transmission rate or the same transmission power, in the resource scheduling process at the base station, a pointer is used to select a proper TFCsb according to the resource request information from the UE and then inform UE of the relevant information. UE select the proper TFC by using another pointer from the TFCsb chosen at the base station. Because each of the scheduling process at the base station and the TFC selection process at the UE uses a pointer separately, the two processes can go more efficiently individually.

16 Claims, 6 Drawing Sheets

U.S. PATENT DOCUMENTS

| | | | | |
|---|---|---|---|---|
| 7,058,032 | B2* | 6/2006 | Iacono et al. | 370/329 |
| 7,200,135 | B2* | 4/2007 | Choi et al. | 370/348 |
| 7,418,010 | B2* | 8/2008 | Cai et al. | 370/498 |
| 2003/0193913 | A1 | 10/2003 | Murata | |
| 2005/0135289 | A1* | 6/2005 | Han et al. | 370/311 |
| 2005/0141560 | A1* | 6/2005 | Muthiah | 370/474 |
| 2005/0163056 | A1* | 7/2005 | Ranta-Aho et al. | 370/252 |
| 2005/0249154 | A1* | 11/2005 | Kim et al. | 370/328 |
| 2006/0268884 | A1* | 11/2006 | Terry et al. | 370/394 |
| 2007/0140179 | A1* | 6/2007 | Zhang et al. | 370/335 |
| 2007/0281695 | A1* | 12/2007 | Lohr et al. | 455/436 |
| 2007/0286146 | A1* | 12/2007 | Kuroda et al. | 370/342 |
| 2008/0170504 | A1* | 7/2008 | Petrovic et al. | 370/235 |
| 2008/0170516 | A1* | 7/2008 | Carmon et al. | 370/310 |

FOREIGN PATENT DOCUMENTS

| | | |
|---|---|---|
| EP | 1 349 332 A1 | 10/2003 |
| WO | WO 2005/115021 A2 | 12/2005 |

* cited by examiner

TFCS in Node B and UE

| TFCsb | TFC | MAC-d flow 1 | MAC-d flow 2 | MAC-d flow 3 | total |
|---|---|---|---|---|---|
| 0 | 0 | 128 | 128 | 128 | 384 |
| 1 | 1 | 128 | 128 | 64 | 320 |
|  | 2 | 128 | 64 | 128 | 320 |
|  | 3 | 64 | 128 | 128 | 320 |
| 2 | 4 | 128 | 128 | 32 | 288 |
|  | 5 | 128 | 32 | 128 | 288 |
|  | 6 | 32 | 128 | 128 | 288 |
| 3 | 7 | 128 | 64 | 64 | 256 |
|  | 8 | 64 | 128 | 64 | 256 |
|  | 9 | 64 | 64 | 128 | 256 |
| 4 | 10 | 128 | 64 | 32 | 224 |
|  | 11 | 128 | 32 | 64 | 224 |
|  | 12 | 64 | 128 | 32 | 224 |
|  | 13 | 32 | 128 | 64 | 224 |
|  | 14 | 64 | 32 | 128 | 224 |
|  | 15 | 32 | 64 | 128 | 224 |

TFCI pointer (signalled from UE to Node B)

UE pointer (commanded up/down to UE by Node B)

Node B allowed TFC subset

Total Tx data rate

Fig. 6

METHOD FOR FAST RESOURCE SCHEDULING IN BASE STATION AND THE BASE STATION

CROSS-REFERENCE TO RELATED APPLICATIONS

This application is entitled to the benefit of Chinese Patent Application No. CN200410093409.9 filed on Dec. 22, 2004 with the Chinese Patent Office.

TECHNICAL FIELD

The present invention relates to wireless communication system, more particularly, relates to the method and device for fast TFCS (Transport Format Combination Set) controlling in the base station (Node B) and user equipment of wireless network.

BACKGROUND OF INVENTION

In wireless network, every time user equipment (UE) is going to transmit data, it needs to request the base station to distribute certain wireless resource. Due to the limited wireless resource in wireless network, base station has to schedule the wireless resource in accordance with the actual requirements of the UEs, distribute the corresponding wireless resource for every UE in order to get the wireless resource used efficiently.

In HSUPA (High Speed Uplink Packet Access), E-DCH (Enhanced Dedicated Channel) will support multi-rate multi-service, which have different QoS (Quality of Service) requirements. Therefore, after getting the resource authorization from the base station, UE should select a proper transport format combination according to the actual requirement of various services or MAC-d flows. Both base station and the UE comprise a TFCS (Transport Format Combination Set), which includes a large number of Transport Format Combinations (TFCs). Both Node B controlled scheduling and UE TFC selection are achieved by operating TFCS. Wherein, TFCS is generated by RNC (Radio Network Controller) and transmitted to UE and Node B via RRC (Radio Resource Controller).

In prior art, generally, the same pointer will be used in Node B scheduling and UE TFC selection. That restricts the efficiency of the two processes. TFCI is used in UE TFC selection for indicating the transport format combination (TFC) in data transport. However, it is the available power RoT (Rise over Thermal) in the current cell to be scheduled by Node B. Thus, the efficiency of using the UE pointer that directly relates to TFCI for implementing the fast TFCS controlling in Node B scheduling process is low, especially when the TFCS list is large.

Node B scheduling process and TFC selection process are not differentiated when operating TFCS in prior art. However, the dynamic parts (e.g. the size and quantity of MAC-d PDU (Protocol Data Unit)) of TFCS are flexible, on the contrary, the selectable physics formats in physical layer are very limited, therefore, the Node scheduling process and data transmitting process should be considered separately to improve the efficiency of Node B scheduling.

It is disclosed that the single pointer solution using step-wise signal transmission in Reference [1] ("Feasibility study for enhancement uplink for UTRA FDD", 3GPP TR25.896, v2.0.0.). And, it's disclosed the single pointer solution using multi-step signal transmission in Reference [6] (R1-04-0912, "Multi-step signalling and synchronization scheme", Alcatel Shanghai Bell). In these traditional Node B scheduling solutions, only one pointer (User Pointer) is used. Said user pointer is used for limiting the "transport format combination subsets controlled by Node B" of UE in Node B scheduling and selecting the proper TFCI in UE TFC selection algorithm, said proper TFCI will be transmitted to Node B by UE in data transmission. Because neither the foresaid step-wise solution nor the multi-step solution differentiates the Node B scheduling process and UE TFC selection process, the aforesaid solutions can not have both the advantages of the two processes simultaneously.

It is disclosed that the multi-pointer solution according to the MAC-d (Medium Access Control-d) flows in Reference [3] (R2-0401294, "Per-Cell, Per-UE, Per-MAC-d Flow basis Scheduling Signaling in Enhanced Uplink", NEC). Wherein, it is suggested that using multiple pointers, each of which points to each sub-TFC of each MAC-d flow, put differently, the number of pointers will increase linearly with the number of MAC-d flows increasing. E-DCH in HSUPA supports multi-rate multi-service, thus, the number of MAC-d flows may be so large that there will be more pointers accordingly. It brings the complexity into Node B scheduling for processing multiple pointers individually and high L1 signaling overhead since all the pointers need to be sent to UE from Node B. Thus, UE will be very sensitive to the error of L1 signaling transmission. It is preferred that Node B distributes available interference headroom to UE so the QoS information can be weighted and then be reported to Node B for scheduling purpose. Detailed QoS information can be considered in the UE TFC selection. Otherwise, all of the QoS information for each service must be transmitted to Node B by RNC or UE. An additional computation is also required to get TFCI from multiple sub-TFCIs for data transmission.

The technical solutions disclosed in Reference [2] (3GPP TR25.808 v0.0.3) and Reference [5] (R1-0400049, "E-DCH link performance—BPSK vs. 8PSK", Qualcomm Europe) show that HSUPA has a highly restricted physical transmission rate but has abundant services, any solution not differentiating the TFCS processing functions for Node B scheduling purpose and the processing functions for data format transmission purpose will reduce the scheduling efficiency of Node B.

SUMMARY OF INVENTION

As described previously, the technical solutions in prior art don't differentiate the Node B scheduling process and TFC selection process in TFCS operation. Therefore, the existing solutions are not preferred for either of the two processes. The present invention realizes that there is only one E-DCH in HSUPA so the total transmission rate/power of said UE is the most important for Node B scheduling. It is unnecessary for Node B to schedule the wireless resource according to each MAC-d flow or to consider the QoS of each MAC-d flow in the point of view of enhancing the throughput and coverage. Thus, UE pointer and TFCI pointer can be used for Node B resource scheduling process and UE TFC(transport format combination) selection process respectively in TFCS operation. Wherein, UE pointer points to TFC subset (TFCsb) which includes a variable number of TFCs. It brings lager granularity than traditional TFC. Accordingly, the adjustment to UE pointer for Node B resource scheduling will be very fast. Each TFCsb represents the set of TFCs with the same data transmission rate (same power) which means the UE will consume the same wireless resource. Said TFCI pointer points to TFC. Each TFC corresponds to a transport format combination.

Particularly, the present invention use a UE pointer which points to TFCsb (Transport Format Combination subset) and a TFCI pointer pointing to Transport TFC, wherein TFCsb is a set of transport format combinations with the same transmission rate. Said TFCsb is used for Node B scheduling by fast TFCS controlling and the number of TFCsb is usually restricted by available physical layer transport format (e.g. modulate, encrypt) which is highly limited in the uplink of HUSPA. Because the object of Node B scheduling by fast TFCS controlling is to optimize the wireless resource (e.g. RoT) distribution among different UEs in order to enhance the throughput and coverage. Appointing this pointer only to TFCsb will not affect UE on selecting a proper TFC or current Node B scheduling; a second kind of pointer points to TFCI and is used for transmitting the transport format in relative data transmission in uplink but not for Node B scheduling purpose.

According to the first aspect of the present invention, a method for resource scheduling by fast TFCS controlling in the base station of a wireless network, said base station stores a transport format combination set, said transport format combination set is divided into transport format combination subsets, wherein each transport format combination subset is the set of transport format combinations with the same data transmission rate or the same transmission power; said method comprising following steps: receiving resource request information from UEs; distributing resource to a UE according to said resource request information from UEs; selecting a proper transport format combination subset based on the resource distributed to said UE in order to generate a first pointing information that indicates said transport format combination subset; including said first pointing information in the resource authorization information and then sending the resource authorization information to the UE.

According to the second aspect of the present invention, a base station for resource scheduling by fast TFCS controlling in a wireless network, comprising: receiving means, controlling means, storing means and transmitting means, said receiving means is for receiving resource request information from UEs, said storing means is for storing a transport format combination set, said transmitting means is for transmitting resource authorization information to said UEs, characterized in that, the transport format combination set stored in said storing means is divided into transport format combination subsets (TFCsbs), wherein each TFCsb is the set of TFCs with the same data transmission rate or the same transmission power; and said controlling means is for distributing resource for said UEs according to said resource request information; and selection a proper TFCsb according to the resource distributed to said UEs in order to generate a first pointing information that indicates said TFCsb and then includes it in said resource authorization information.

According to the third aspect of the present invention, a method for selecting TFC by fast TFCS controlling at the UE in wireless network, wherein there is a transport format combination set (TFCS) stored in UE, said TFCS is divided into transport format combination subsets (TFCsbs), each of which is the set of TFCs with the same data transmission rate or the same transmission power; said method comprises following steps of: receiving resource authorization information from a base station, said resource authorization information comprises a first pointing information for indicating the TFCsb; selecting a proper TFC from the TFCsb indicated by said first pointing information and generating a second pointing information which denotes said TFC; transmitting said second pointing information to said base station.

According to the fourth aspect of the present invention, an User Equipment (UE) for selecting TFC by fast TFCS controlling in a wireless network, comprises: receiving means, controlling means, storing means and transmitting means, said receiving means is for receiving the authorization information from a base station, the storing means is for storing a transport format combination set(TFCS) and, said transmitting means is for transmitting a TFC information selected by said UE to said base station, characterized in that: said TFCS stored in the storing means is divided into transport format combination subsets (TFCsbs), each of which is the set of TFCs which have the same data transmission rate or the same transmission power; said resource authorization information comprises the first pointing information for indicating TFCsb; said controlling means is for selecting a proper TFC from the TFCsb indicated by said first pointing information and generating a second pointing information for indicating said TFC; and said transmitting means is for transmitting said second pointing information to the base station.

In the present invention, the two processes: the Node B scheduling process and the TFC selection process at the UE, each of them uses a pointer individually so that the two processes can run separately in the optimized way. Only two pointers needed, no matter how complex the TFCS in HUSPA is, the Node B scheduling process will be very efficient. That is because the Node B scheduling mostly depends on available physical resource when TFC selection mainly relates to the variety of the services and the QoS.

Furthermore, less L1 signaling overhead is required to achieve the variable compensation adjustment equivalent to that in single pointer solution. The complexity will be controllable even though E-DCH supports large numbers of different services with different QoSs, because the two pointers is based on the Node B scheduling process and TFC selection process but independent of the number of MAC-d flows. Moreover, the present invention is backward compatible with TR25.896.

The complexity brought by dual-pointer solution can be ignored for it has no influence to RNC (Radio Network Controller) and L1 signaling transport. That is because the RNC TFCS has not been changed and maintains the step-wise adjustment as disclosed in Reference [1]. With said two pointers for different processes, the efficiency of Node B scheduling and UE TFC selection will be enhanced simultaneously.

BRIEF DESCRIPTION OF DRAWINGS

FIG. 6 shows an example that performing fast TFCS controlling with two pointers according to the present invention.

DESCRIPTION OF PREFERRED EMBODIMENTS

The preferred embodiments of the present invention as follow will be described in detail with reference of companying drawings. But, it shall be understood that the present invention doesn't limit to the particular embodiments.

Figure 1:
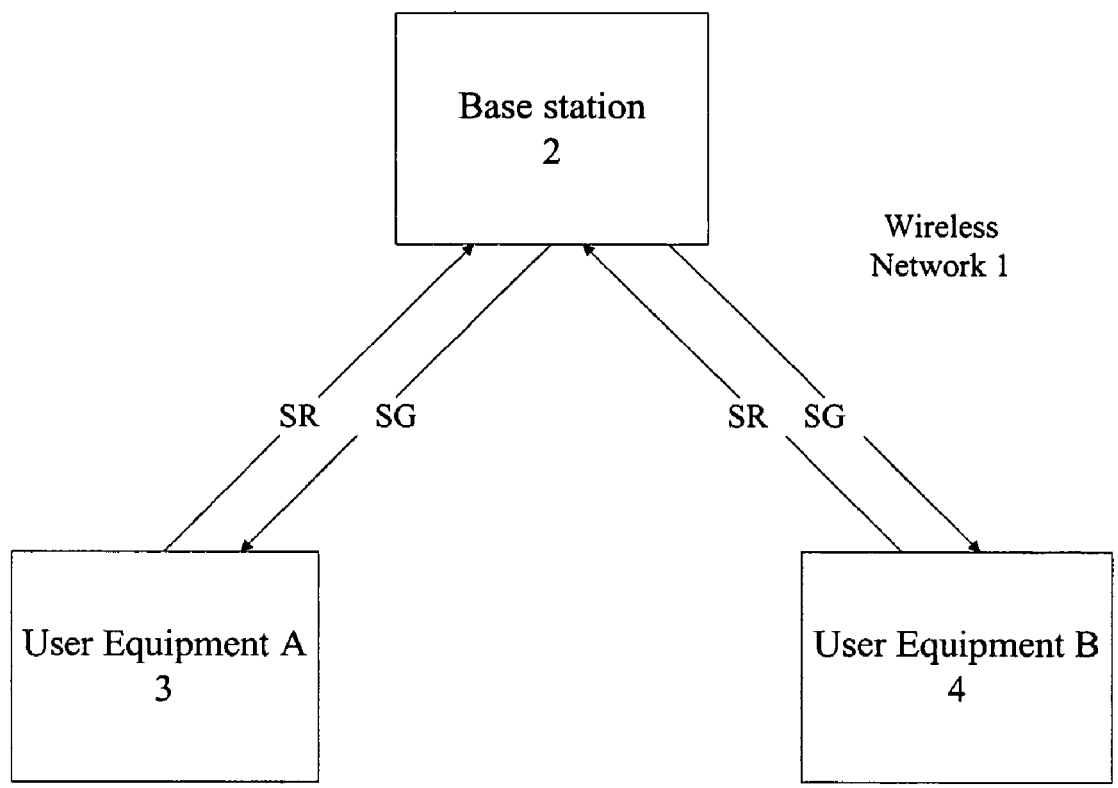
FIG. 1 is the topology figure of a wireless network.

FIG. 1 shows a wireless network 1 according to the present invention, said network comprises a Base Station 2 and several User Equipments (UEs) (for simpleness, only UE 3 and UE4 are shown in the figure). In the wireless network 1, UE 3 and 4 need to send resource request information SR to Base Station (Node B) 2 in order to ask for wireless resource distributed. Base station 2 distributes resource to different UEs according to the resource request information from UEs and sends corresponding resource authorization information SG to every UE.

Figure 2:
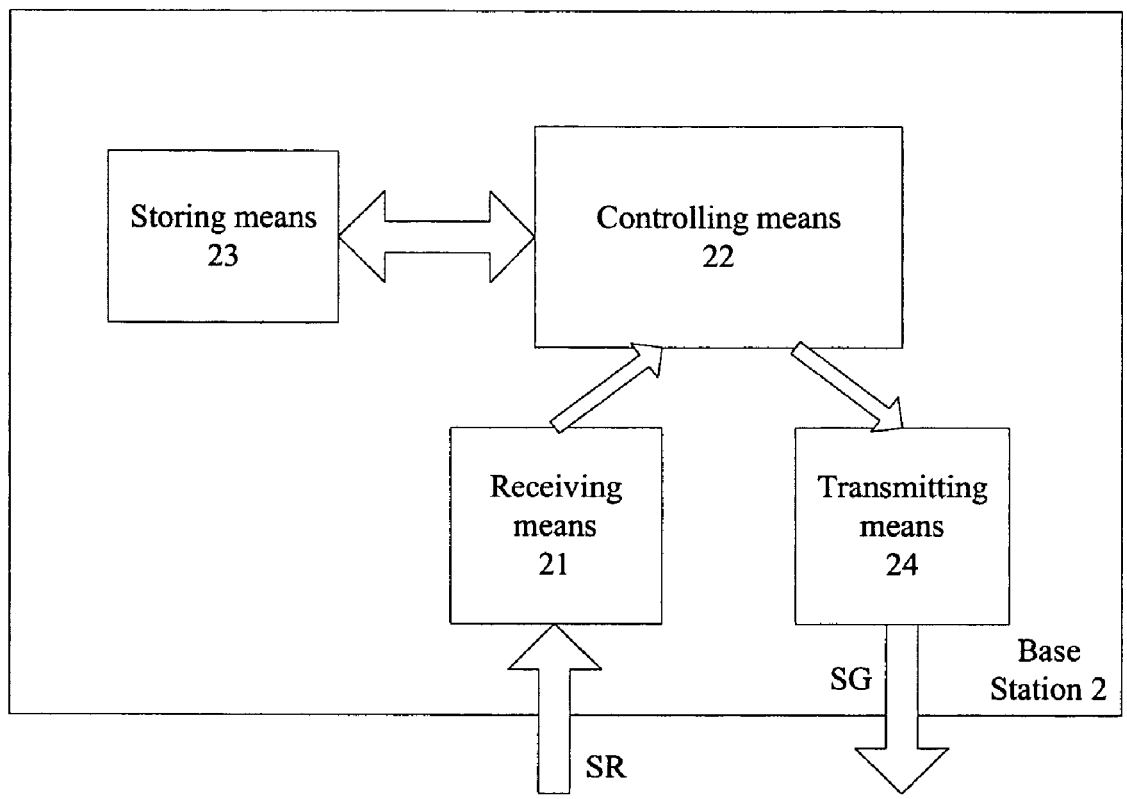
FIG. 2 shows the block diagram of a base station for resource scheduling by fast TFCS controlling in wireless network according to a preferred embodiment of the present invention.

FIG. 2 shows the block diagram of a base station for resource scheduling by fast TFCS controlling in wireless network according to a preferred embodiment of the present invention. Base station 2 comprises a receiving means 21, a controlling means 22, a storing means 23 and a transmitting means 24. Wherein, said receiving means is for receiving the resource request information SR from UE; said storing means 23 is for storing TFCS, said TFCS is divided into TFCsbs, each of which is the set of the TFCs with the same transmission rate (equivalent to the same transmission power); said controlling means 22 is for distributing resource for UEs according to said resource request information from UEs and adjusting a UE pointer pointing to a proper TFCsb according to the resource distributed to UE; said transmitting means 24 is for transmitting the resource authorization information comprising said user pointing information to said UE.

Figure 3:
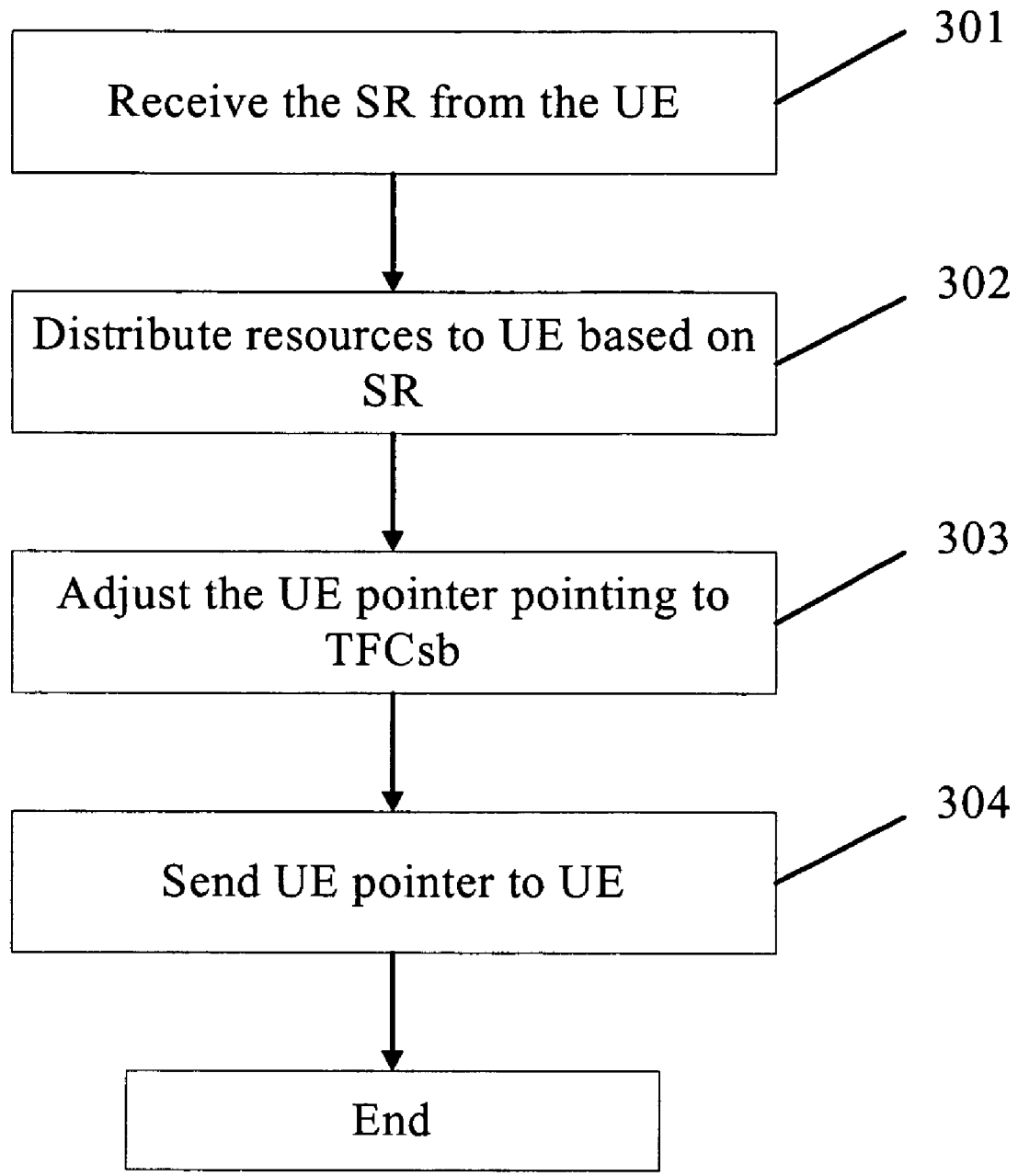
FIG. 3 shows the flow chart of a method for resource scheduling by fast TFCS control in a base station of wireless network according to a preferred embodiment of the present invention.

FIG. 3 shows the flow chart of the method for resource scheduling by fast TFCS controlling in the base station in wireless network according to a preferred embodiment of the present invention. Wherein, the resource scheduling process at base station is described with the network topology figure shown in FIG. 1 and the frame chart of base station shown in FIG. 2 companying. There is a transport format combination set (TFCS) stored in base station 2, wherein said TFCS is divided into TFCsbs and each TFCsb is the set of TFCs with the same data transmission rate (equivalent to the same transmission power).

In step 301, base station 2 receives the resource request information (SR) from UEs. In step 302, schedule the resource based on the resource request information from UEs and distribute relevant resource for every UE; the priority of UEs and/or the QoS of MAC-d flows can be considered simultaneously to use resource with better efficiency and avoid that the services which is sensitive to delay can't transport data in a long term then get discarded, namely "starvation" since the limited resource are occupied by other services with higher priority.

In step 303, based on the resource distributed to every UE, using step-wise or multi-step solution to adjust a user equipment pointer (UE pointer) to point to the TFCsb matching the resource distributed to said UE;

In step 304, including the UE pointer as the first pointing information in the resource authorization information and sent it to UE.

Figure 4:
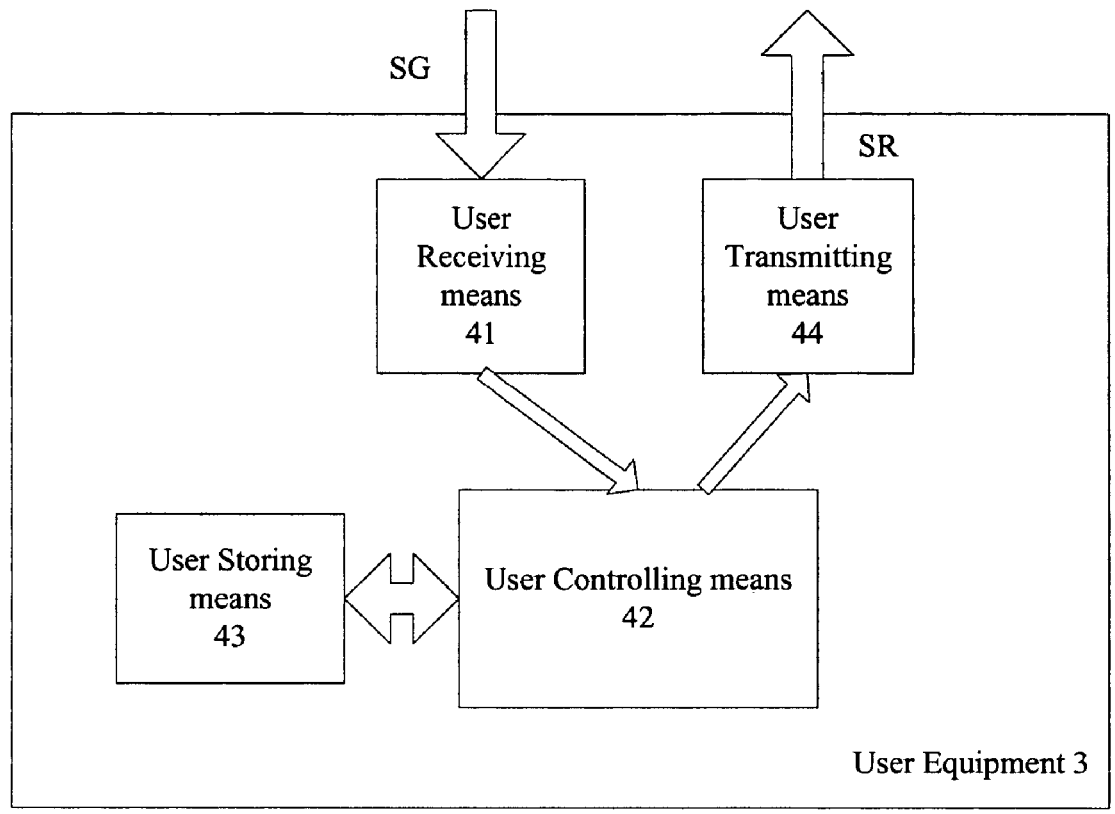
FIG. 4 shows the block diagram of an UE for selecting TFC by fast TFCS controlling in wireless network according to a preferred embodiment of the present invention.

FIG. 4 shows the frame chart of the UE for selecting TFC by fast TFCS controlling in a wireless network according to a preferred embodiment of the present invention. It is assumed that UE 3 possesses some on-going services and MAC-d flows, each service and MAC-d flow may has different QoS.

UE 3 comprises an user receiving means 41, an user controlling means 42, an user storing means 43 and an user transmitting means 44, also a buffer there not shown for conciseness which is used for buffering service data to be transported. Wherein, user receiving means 41 is for receiving the resource authorization information SG which is sent from the base station 2 and comprises the first pointing information for indicating the TFCsb; user storing means 43 has a TFCS stored in it, the TFCS stored in said user storing means 43 is divided into TFCsbs, each of which is the set of the TFCs with the same transmission rate (equivalent to the same transmission power); said user controlling means 42 is for selecting a proper TFCsb from said TFCS according to said first pointing information and selecting a proper TFC according to actual requirements (e.g. buffer information, QoS information of service/MAC-d flow) and generating a second pointing information indicating said TFC; user transmitting means 44 is for transmitting said second pointing information to the base station 2.

Figure 5:
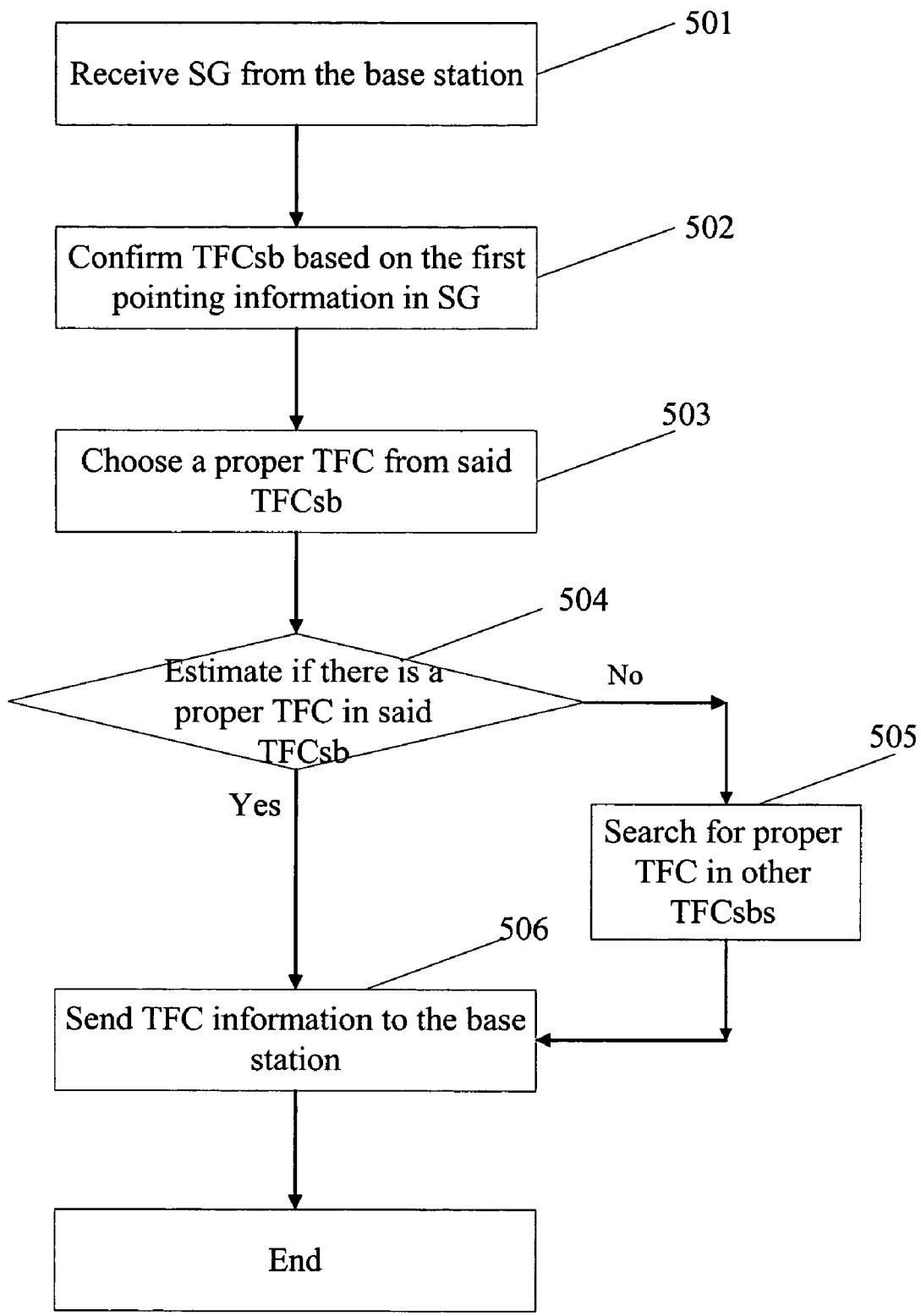
FIG. 5 shows the flow chart that a method for selection TFC by fast TFCS controlling in UE in wireless network according to a preferred embodiment of the present invention.

FIG. 5 shows the flow chart of the method for selecting TFC by fast TFCS controlling in an user equipment (UE) in wireless network according to a preferred embodiment of the present invention. Herein, the process that UE chooses TFC will be described with the wireless network topology figure shown in FIG. 1 and the block diagram of UE in wireless network shown in FIG. 4. It is assumed that UE 3 has some on-going services and MAC-d flows, each service and MAC-d has different QoS. Furthermore, there is a transport format combination set (TFCS) stored in UE 3, wherein said TFCS is divided into TFCsbs, each of which is the set of the TFCs with the same transmission rate (equivalent to the same transmission power).

In step 501, UE 3 receives the resource authorization information (SG) from the base station, said resource authorization information comprises a first pointing information denoting the TFCsb;

In step 502, select a proper TFCsb from said TFCS based on said first pointing information;

In step 503, adjust a TFC pointer to point to a proper TFC in order to meet the actual requirement at the UE by using step-wise or multi-step solution according to the actual requirement (e.g. buffer information, QoS information of service/MAC-d flow) at the UE;

In step 504, estimate that if there is a proper TFC found in said TFCsb, if not, proceed to step 505, continue to search a proper TFC in other TFCsbs; if yes, proceed to step 506.

In step 506, transmit said TFC pointer as the second pointing information to base station 2.

In the solutions described with FIG. 4 and 5 as references, it is mentioned that QoS information can be considered when selecting TFC at the UE. That is because that the QoS of services is become more and more important in high-speed packet services and it must be considered that how to use the available resource efficiently. The suggestions on QoS TFC selection are given and discussed in the Reference [4] (R2-041346, "QoS guaranteed TFC selection", LG Electronics Inc.). In TFCsb, the TFCI pointer will be determined by the QoS TFC selection at the UE and then sent to the base station through E-DPCCH (Enhanced-Dedicated Physical Control Channel). It's easy to select a proper TFCI (Transport Format Combination Indicator). Any QoS-based TFC selection can be used in the solution of the present invention.

Then, to describe the present invention clearer and compare it with other solutions in prior art, a example will be described with reference of FIG. 6. In FIG. 6, the total rate corresponds to the total transmission power that UE requires.

FIG. 6 shows a TFCS at the base station (Node B) and the user equipment (UE). The UE has 3 MAC-d flows 1-3, according to the different number of the transport blocks occupied by each MAC-d flow, there may be various TFCs. The TFCS in FIG. 6 comprises 16 TFCs:0-15, which are divided into 5 TFCsbs according to the total number of transport blocks (corresponds to required transmission power). UE pointer and TFCI pointer are also shown in FIG. 6, wherein TFCI pointer is sent to Node B by UE and, UE pointer is used for the resource scheduling at Node B, it will be adjusted by Node B in accordance with the resource requests from UEs. For instance, if TFCI pointer needs to be moved from TFC1 to TFC15, only 3 steps are required to move UE pointer from TFCsb1 where TFC1 locates to TFCsb4 where TFC15 locates according to the dual-pointer solution of the present invention. Thus, only 3-bit signaling is required since it is stepwise.

On the contrary, for the single pointer step-wise solution in the prior art, a total 14 steps are required in step-wise scheme and thus 14-bit signaling overhead is required. For multi-step solution, 4 steps are required when multi-step=4 in which at least 2-bit L1 signalling is required to accomplish the adjustment and in total 8-bit L1 signaling is required. For the multi-pointer solution in Reference [3], three pointers are required and pointer 1 (corresponds to MAC-d flow 1) will move down 3 steps while pointer 2 will move down 1 step but pointer 3 will move up 1 step and in total 5-bit signaling is required. With the number of MAC-d flows multiplexed into the same E-DCH within the same TTI increasing, the average amount of TFCs in TFCsb will increase and the gain using dual-pointer will become more larger.

Certainly, in the dual-pointer solution of the present invention, extra effort may be needed at UE to move TFCI pointer from TFC 1 to TFC 15. In Node B scheduling, it only gives upper limit on the TFC selection. It is not the real TFC that UE is using. Hence it is quite easy for UE to select a proper TFCI within TFCsb using the current algorithm with the service information (e.g. QoS). The gain using dual-pointer solution will increase exponentially with the increasing possible services or MAC-d flows.

Although the present invention has been described in detail, it should be understood that various changes, substitutions and alterations can be made hereto without departing from the spirit and scope of the invention as described by the appended claims.

References:
[1] 3GPP TR25.896, "Feasibility study for enhancement uplink for UTRA FDD", v2.0.0.
[2] 3GPP TR25.808 v0.0.3
[3] R2-0401294, "Per-Cell, Per-UE, Per-MAC-d Flow basis Scheduling Signaling in Enhanced Uplink", NEC
[4] R2-041346, "QoS guaranteed TFC selection", LG Electronics Inc.
[5] R1-0400049, "E-DCH link performance—BPSK vs. 8PSK", Qualcomm Europe
[6] R1-04-0912, "Multi-step signalling and synchronization scheme", Alcatel Shanghai Bell

The invention claimed is:

1. A method of uplink resource scheduling by fast transport format combination set controlling in the base station of a wireless network, the method comprising:
the base station storing a transport format combination set, wherein resource request information from one or more user equipment is received, and wherein resource is distributed to each user equipment according to the resource request information, wherein the transport format combination set is divided into transport format combination subsets, wherein each transport format combination subset is the set of transport format combinations with the same data transmission rate or the same transmission power;
generating a first pointing information that indicates a transport format combination subset by selecting a proper transport format combination subset with the same data transmission rate or the same transmission power based on the resource distributed to the user equipment,
including the first pointing information in a resource authorization information and then sending the resource authorization information to the user equipment; and
receiving a second pointing information from the user equipment, the second pointing information denoting a proper transport format combination selected by the user equipment from the transport format combination subset indicated by the first pointing information according to actual requirements at the user equipment, such as a buffer information and/or a quality of service information of MAC-d flows.

2. The method according to claim 1, wherein the step of distributing resource to user equipment comprises distributing resource to user equipment in accordance with the priority information of user equipment or the weight information of the MAC-d flows.

3. The method according to claim 1, wherein the step of selecting a proper transport format combination subset is implemented by adjusting a user equipment pointer pointing to transport format combination subset.

4. The method according to claim 1, wherein the transport format combinations are enhanced transport format combinations used in enhanced dedicated channel.

5. A base station for uplink resource scheduling by fast transport format combination set controlling in a wireless network, the base station comprising:
receiving means for receiving resource request information (SR) from user equipment;
controlling means for distributing resources for the user equipment according to the resource request information (SR);
storing means for storing a transport format combination set (TFCS);
transmitting means for transmitting a resource authorization information (SG) to the user equipment, wherein the transport format combination set (TFCS) stored in the storing means is divided into transport format combination subsets, TFCsb, (TFCsb), and wherein each TFCsb is the set of TFCs with the same data transmission rate or the same transmission power; and generating a first pointing information (user equipment pointer) that indicates a TFCsb by selecting a proper TFCsb with the same data transmission rate or the same transmission power according to the resource distributed to the user equipments, and then includes it in the resource authorization information (SG), and wherein means for receiving second pointinq information (TFCI pointer) from the user equipment, the second pointing information denoting a proper TFC selected by the user equipment from the transport format combination subset (TFCsb) indicated by the first pointing information (user equipment pointer) accordinq to actual requirements at the user equipment, such as a buffer information and/or quality of service information of MAC-d flows.

6. The base station according to claim 5, wherein the storing means is further for storing the weight information of every MAC-d flow; the controlling means is
- further for distributing resource to user equipment according to the weight information of the MAC-d flows.

7. The base station according to claim 5, wherein the controlling means is further for selecting a proper TFCsb by adjusting a user equipment pointer (user equipment pointer) pointing to TFCsb.

8. The base station according to claim 5, wherein the TFGs are enhanced TFCs used in enhanced dedicated channel.

9. A method for selecting TFC by fast TFCS controlling at the user equipment in wireless network, wherein there is a transport format combination set (TFCS) stored in user equipment, the method comprises following steps of:
- receiving resource authorization information (SG) from a base station, wherein the TFCS is divided into transport format combination subsets (TFCsb), each of which is the set of TFCs with the same data transmission rate or the same transmission power;
- selecting a proper TFC according to actual requirements at the user equipment, such as a buffer information and/or a quality of service information of a MAC-d flow, from the TFCsb indicated by the first pointing information (user equipment pointer) and generating a second pointing information (TFCI pointer) which denotes the TFC, wherein the resource authorization information (SG) comprises a first pointing information (user equipment pointer) for indicating a TFCsb; and
- transmitting the second pointing information (TFCI pointer) to the base station.

10. The method according to claim 9, wherein the step of selecting a proper TFC also comprises selection a proper TFC from the TFCsb according to the QoS information of services or QoS information of logic channel.

11. The method according to claim 9, further comprises, if there is no proper TFC found in the TFCsb indicated by the first pointing information (user equipment pointer), continuing to searching a proper TFC in other TFCsbs.

12. The method according to claim 9, wherein the TFCs are enhanced TFCs used in enhanced dedicated channel.

13. An apparatus for selecting TFC by fast transport format combination set (TFCS) controlling in a wireless network, the apparatus comprising:
- receiving means for receiving a resource authorization information (SG) from a base station;
- controlling means for selecting a proper TFC according to actual requirements at the DE, such as a buffer information and/or a quality of service information of a MAC-d flow, from the TFCsb indicated by the first pointing information (user equipment pointer) and generating a second pointing information (TFCI pointer) for indicating the TFC;
- storing means storing means is for storing a transport format combination set, (TFCS); and
- transmitting means for transmitting the second pointing information (TFCI pointer) to the base station, wherein the TFCS stored in the storing means is divided into transport format combination subsets (TFCsbs), each of which is the set of TFCs which have the same data transmission rate or the same transmission power, the resource authorization information (SG) comprises a first pointing information (user equipment pointer) for indicating a TFCsb.

14. The apparatus according to claim 13, wherein the controlling means is for selecting a proper TFC from the TFCsb according to the QoS information of the services or the QoS information of the logic channel.

15. The apparatus according to claim 13, wherein, the controlling means is further for continuing to search a proper TFC in other TFCsbs if there is no such TFC found in the TFCsb indicated by the first pointing information (user equipment pointer).

16. The apparatus according to claim 13, wherein the TFCs are enhanced TFCs used in enhanced dedicate channel.

* * * * *

UNITED STATES PATENT AND TRADEMARK OFFICE
CERTIFICATE OF CORRECTION

| | | |
|---|---|---|
| PATENT NO. | : 7,613,145 B2 | Page 1 of 1 |
| APPLICATION NO. | : 11/295613 | |
| DATED | : November 3, 2009 | |
| INVENTOR(S) | : You et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Nineteenth Day of October, 2010

David J. Kappos
*Director of the United States Patent and Trademark Office*